United States Patent
Koh (10) Patent No.: US 7,574,169 B2
(45) Date of Patent: Aug. 11, 2009

(54) CONTENTS PROVIDING SYSTEM AND MOBILE COMMUNICATION TERMINAL THEREFOR

(75) Inventor: Jean Koh, Gyeonggi-do (KR)

(73) Assignee: Varovision Co., Ltd., Daechi-Dong, Gangnam-Gu, Seoul (KR)

( * ) Notice: Subject to any disclaimer, the term of this patent is extended or adjusted under 35 U.S.C. 154(b) by 221 days.

(21) Appl. No.: 10/569,520

(22) PCT Filed: Aug. 26, 2004

(86) PCT No.: PCT/KR2004/002148

§ 371 (c)(1),
(2), (4) Date: Dec. 1, 2006

(87) PCT Pub. No.: WO2005/022764

PCT Pub. Date: Mar. 10, 2005

(65) Prior Publication Data

US 2007/0115345 A1    May 24, 2007

(30) Foreign Application Priority Data

Aug. 29, 2003   (KR) .................... 10-2003-0060139

(51) Int. Cl.
*H04H 7/00* (2006.01)
(52) U.S. Cl. ............... 455/3.06; 455/414.1; 455/456.5; 348/14.02
(58) Field of Classification Search .............. 455/3.06, 455/407, 556.2, 561, 438, 183.2, 186.1; 348/14.02, 348/384.1, 398.1, 437.1, 438.1; 701/211, 701/200; 709/246, 217
See application file for complete search history.

(56) References Cited

U.S. PATENT DOCUMENTS

2002/0129374 A1* 9/2002 Freeman et al. ............... 725/91

(Continued)

FOREIGN PATENT DOCUMENTS

KR    10-362867 B1    12/2002

(Continued)

OTHER PUBLICATIONS

International Search Report and Written Opinion of the International Searching Authority for PCT/KR2004/002148 (Nov. 23, 2004).

*Primary Examiner*—Tan Trinh
(74) *Attorney, Agent, or Firm*—Fargre & Benson LLP (57) ABSTRACT

Disclosed is related to a contents providing system and mobile communication terminal therewith for providing pre-stored digital contents to the mobile communication terminal of a user, comprising: a controller for controlling an overall operation; an input unit for introducing an operation command from a user; a storage unit for storing data; a radio transceiver for carrying out a radio communication with the mobile communication network and receiving contents through the mobile communication network; a display unit for showing operational information and motion pictures; a digital-to-analog converter for transforming a digital signal into an analog signal for voice output; an amplifier for amplifying and transferring the analog signal converted in the digital-to-analog converter to a speaker; and an MPEG processor for decoding the contents received through the radio transceiver and adjusting a reproducing speed. Accordingly, the present invention is effective in offering real-time or pre-stored digital contents to a terminal of a user, and recovering a real-time reproducing time by adjusting a reproducing time even when contents transmission is interrupted by line busy or communication trouble or by a user's intention for re-watching the past image while providing contents.

5 Claims, 8 Drawing Sheets

U.S. PATENT DOCUMENTS

2004/0044473 A1* 3/2004 Leem .................... 701/211
2004/0049598 A1* 3/2004 Tucker et al. ............ 709/246
2004/0221319 A1* 11/2004 Zenoni .................. 725/132

FOREIGN PATENT DOCUMENTS

| KR | 2003-52543 A | 6/2003 |
|---|---|---|
| KR | 2004-13455 A | 2/2004 |
| KR | 10-442060 B1 | 7/2004 |

* cited by examiner

FIG. 8 ents providing system and mobile communication terminal therefor

TECHNICAL FIELD

The present invention relates to a contents providing system capable of providing various patterns in reproducing contents preliminarily stored or in a real time by means of a mobile communication terminal, and to a mobile communication terminal therefor.

BACKGROUND ART

Conventionally, video and audio program signals are compressed, encoded, and multiplexed after being converted into digital formats in appliance with generalized algorithm or methods. A compressed digital system signal, i.e., a bitstream, contains a video component, an audio component, and other information components, which is transferred to a reproducing device by way of a transmission line or with being stored in a storage medium. A digital reproducing device for reproducing multimedia data multiplexed with video data, audio data, and so on is associated with decoding means to reproduce such a bitstream, as like a DVD system, a digital VCR, or a computer system embedding a multimedia player solution. The decoding means de-multiplexes a bitstream in accordance with a compressing algorithm, releases the compression, and decodes to generate a reproducible signal. Decoded video and audio signals are outputted to a reproducing device such as a screen or a speaker to offer impressions for users.

The digital contents are provided for users in various ways. Nowadays, as it becomes available to offer a data service even with a mobile communication network due to improvements in technologies of mobile communications and terminals, digital contents services are required in various types and users wish to be provided with such various digital contents by way of their mobile communication terminals.

Therefore, it needs a system capable of providing motion pictures through a mobile communication terminal in a real time and a technique for the mobile communication terminal, and also needs a variety of techniques solving problems inducible therefrom.

DISCLOSURE OF INVENTION

An object of the present invention is directed to provide a contents providing system capable of providing various patterns in reproducing contents preliminarily stored or in a real time by means of a mobile communication terminal, and to provide a mobile communication terminal therefor.

In order to accomplish the object of the present invention, a mobile communication terminal for reproducing digital contents provided through a mobile communication network comprises: a controller for controlling an overall operation; an input unit for introducing an operation command from a user; a storage unit for storing data; a radio transceiver for carrying out a radio communication with the mobile communication network and receiving contents through the mobile communication network; a display unit for showing operational information and motion pictures; a digital-to-analog converter for transforming a digital signal into an analog signal for voice output; an amplifier for amplifying and transferring the analog signal converted in the digital-to-analog converter to a speaker; and an MPEG processor for decoding the contents received through the radio transceiver and adjusting a reproducing speed.

Further the present invention provides a contents providing system including a contents providing server for providing digital contents to a mobile communication terminal through a mobile communication network, the contents providing server comprising: a web server for providing a web page by way of an internet and controlling web connection; a contents control server for managing a contents providing condition and regulating a reproducing speed; and a streaming server for providing MPEG data, which is supplied by the contents control server with motion-picture contents including audio data or audio contents only containing audio data, to a mobile communication terminal connected thereto through the web server in a streaming service form.

BEST MODE FOR CARRYING OUT THE INVENTION

Now, it will be described in detail about an embodiment of the present invention in conjunction with the accompanying drawings.

Figure 1:
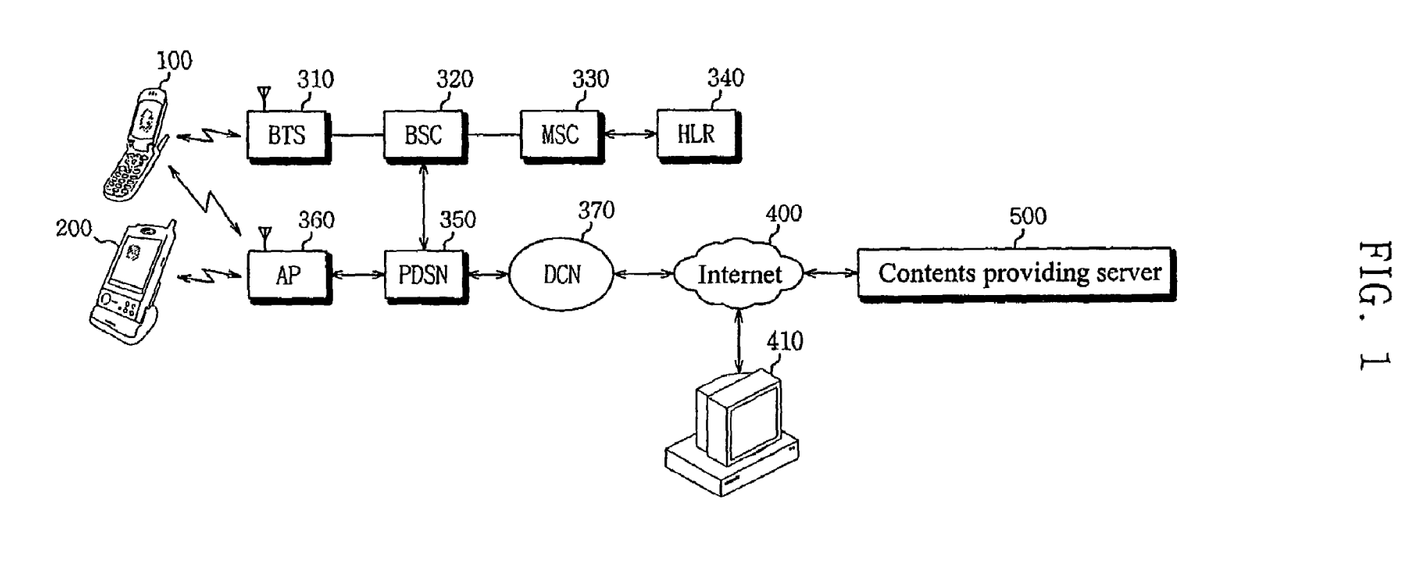
FIG. 1 is a block diagram illustrating an interconnection feature of a contents providing system according to the present invention.

FIG. 1 is a block diagram illustrating an interconnection feature of a contents providing system according to the present invention.

Referring to FIG. 1, a mobile communication network is comprised of a base station (BTS) 310 for performing a radio communication with a mobile communication terminal 100, a base station controller (BSC) 320 for operating the BTS 310, a switch (MSC) 330 connected to the BSC 320 to exchange a call therewith, a home location register (HLR) 340 connected to the MSC 330 to manage positioning information of a user, a packet data service node (PDSN) 350 connected to the BSC 320 to provide a packet data service, and a data core network (DCN) 370 connected to the PDSN 350.

In addition, an access point (AP) 360 is connected to the PDSN 350 to provide a wireless LAN to the mobile communication terminals 100 and 200. An internet 400 is connected to the DCN 370 and a contents providing server 500.

The contents providing server 500 provides preliminarily stored motion-picture contents or real-time motion-picture contents to the mobile communication terminal 100 (or 200) by way of the mobile communication network. The mobile communication terminal 100 (or 200) receives the motion picture from the contents providing server 500 and reproduces the motion picture to enable a user to enjoy the motion picture.

The motion-picture contents may be motion-picture MPEG data containing audio data or audio MPEG data (e.g., MP3) consisting of audio data only, and the mobile communication terminal includes a decoder to decode the MPEG data.

The present invention provides the performance able to reproduce MPEG data in a speed twice by adjusting a reproducing speed of data. With the capability of the present invention, it is possible to shorten a watching time for a motion picture or a listening time for audio by increasing the reproducing speed of the motion-picture or the audio.

The adjustment for a reproducing time of MPEG data is carried out in the mobile communication terminal or preliminarily set by the contents providing server offering contents. First, it will be described about the case of adjusting a reproducing time of MPEG data in the mobile communication terminal, showing a structure of the mobile communication terminal 100 as an example.

There have been disclosed various techniques in adjusting an audio reproducing time. Especially, Korean Patent Publication No. 10-2002-0049087 proposes a method and apparatus for reproducing audio signals without inducing variation of voice color even in a speed-variable reproducing mode, in which although changing an audio reproducing speed, a change of voice color during a reproducing mode in high-speed and low-speed is prevented by restraining pitch variations.

Figure 2:
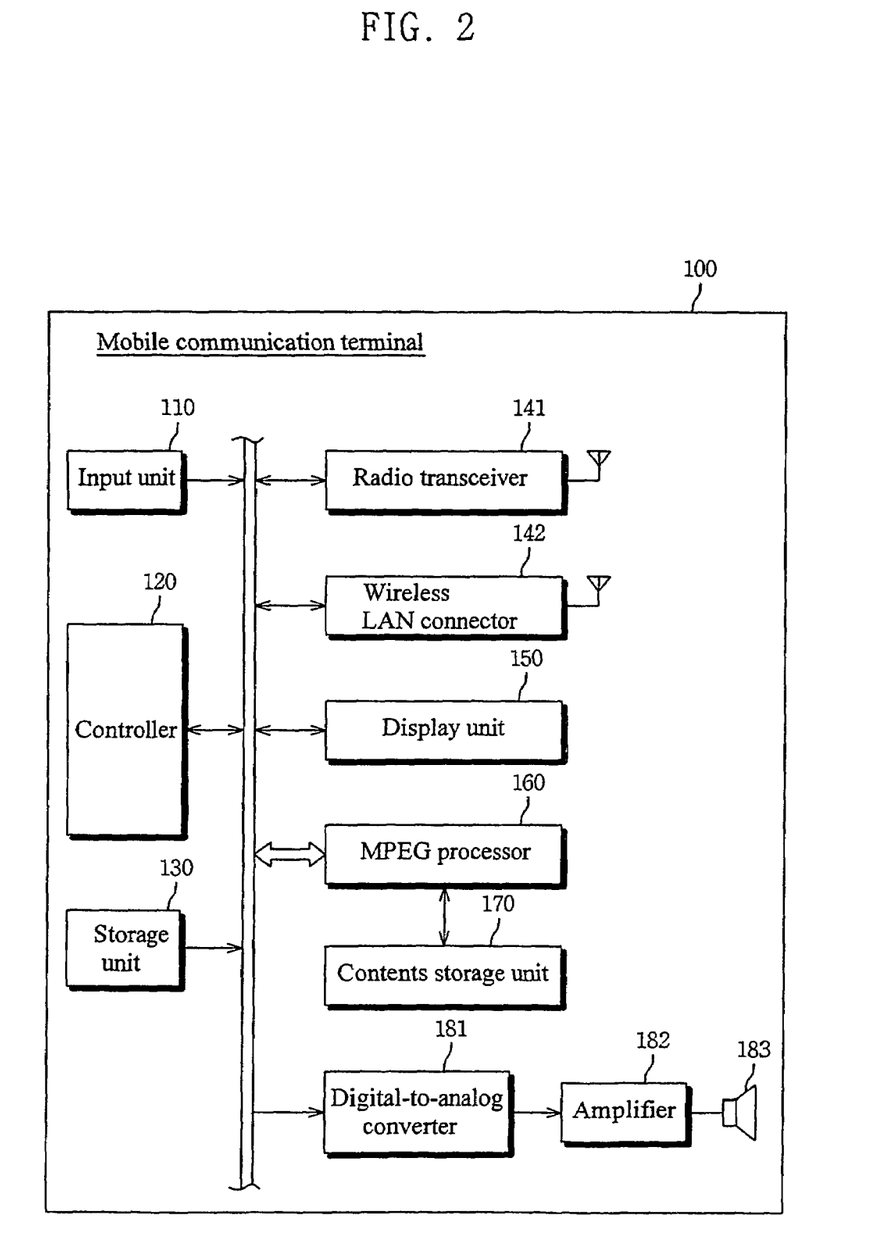
FIG. 2 is a block diagram illustrating an embodied structure of a mobile communication terminal according to the present invention.

FIG. 2 is a block diagram illustrating an embodied structure of the mobile communication terminal 100 according to the present invention.

Referring to FIG. 2, the mobile communication terminal 100 according to the present invention is comprised of a controller 120 for controlling an overall operation, an input unit 110 for introducing operation commands from a user, a storage unit 130 for storing data, a radio transceiver 141 for carrying out a radio communication with the BTS 310 of the mobile communication network, a wireless LAN connector 142 for carrying out wireless connection with the AP 360, a display unit 150 for showing operational information and motion pictures, a digital-to-analog converter 181 for transforming a digital signal into an analog signal for voice output, and an amplifier 182 for transferring the analog signal, which is amplified from the digital signal, to a speaker 183.

The mobile communication terminal 100 also includes an MPEG processor 160 for operating MPEG data, and a contents storage unit 170 for storing data processed from the MPEG data.

The MPEG processor 160 which decodes MPEG data (audio data or motion-picture data containing audio data) transmitted from the contents providing server 500 through the mobile communication network, and adjusts its reproducing speed, is constructed in detail as follows.

Figure 3:
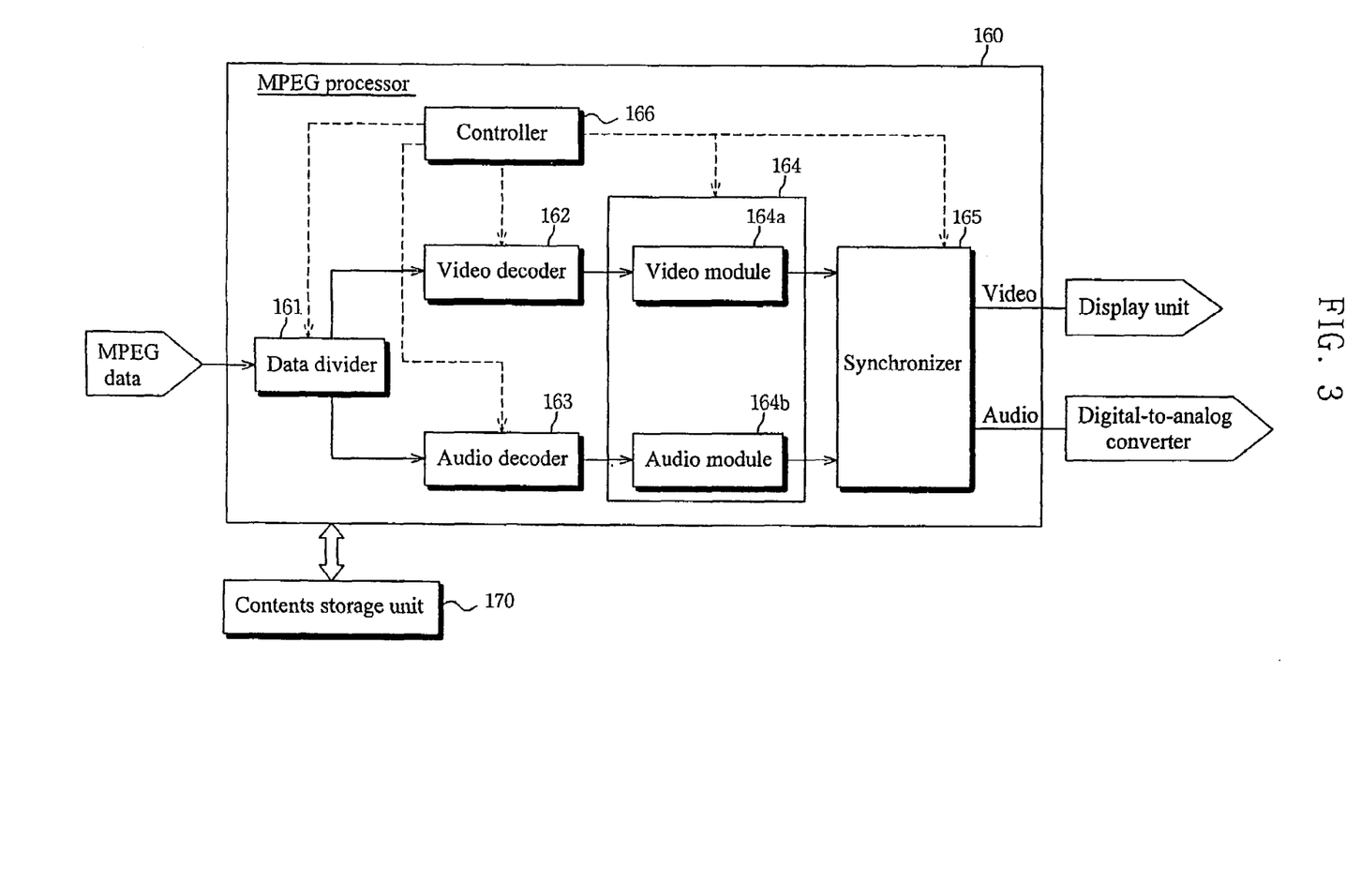
FIG. 3 is a block diagram illustrating an embodied structure of an MPEG processor according to the present invention.

FIG. 3 is a block diagram illustrating an embodied structure of the MPEG processor according to the present invention.

Referring to FIG. 3, the MPEG processor 160 according to the present invention is comprised of a data divider 161 for separating video and audio data from MPEG data, a video decoder 162 for decoding the video data separated by the data divider 161 in a predetermined format, and an audio decoder 163 for decoding the audio data separated by the data divider 161 in a predetermined format.

The MPEG processor 160 also includes a speed regulator 164 for processing data to adjust reproducing speeds of the video and audio data supplied respectively from the video and audio decoders 162 and 163, and a synchronizer 165 for setting synchronization between the video and audio data adjusted in reproducing speeds by the speed regulator 164.

Figure 4:
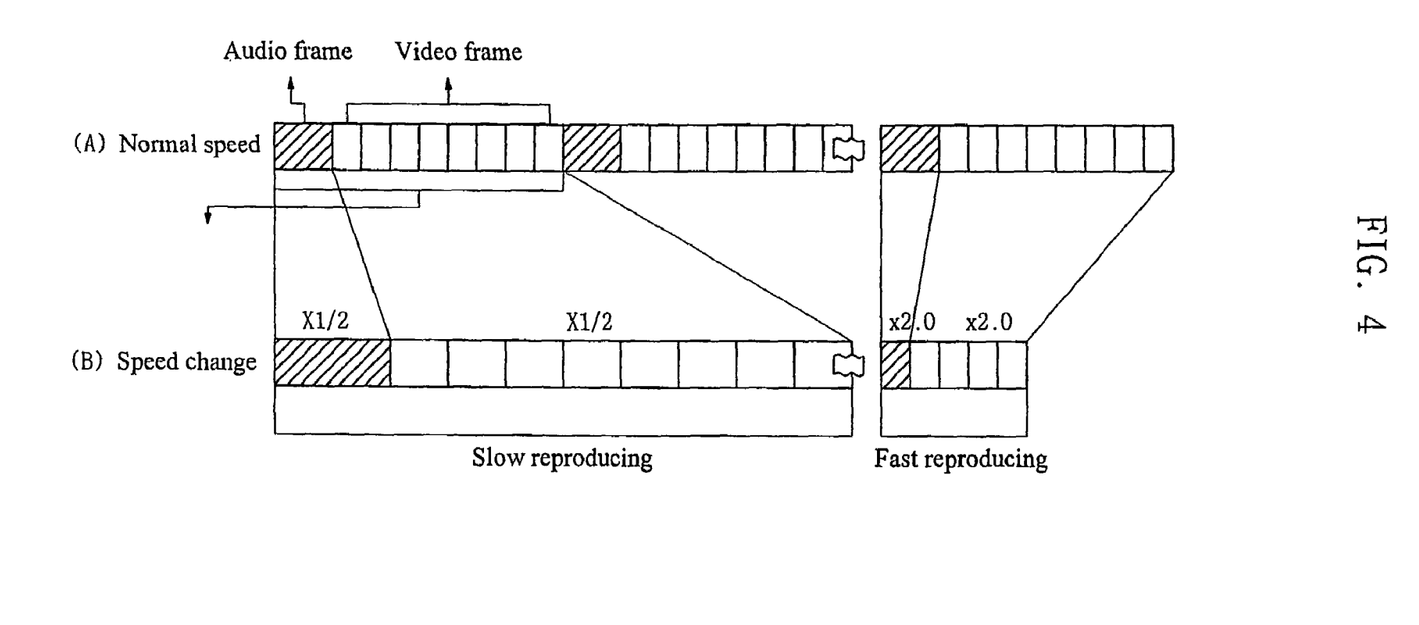
FIG. 4 is a schematic diagram illustrating data synchronization according to the present invention.

The synchronizer 165 is provided to synchronize the video data with the audio data as shown in FIG. 4. A section (A) of FIG. 4 illustrates a data bitstream being reproduced in a normal speed, while a section (B) of FIG. 4 illustrates a data bitstream being reproduced in a changed speed.

As shown in FIG. 4, an audio frame containing audio data and a video frame containing video data are constituted in the format of data packets. In the data packet typically composed of the audio and video frames, the video frame includes more data than the audio frame because of its property.

Comparing the section (B) of data bitstream with the section (A) of a normal reproducing speed, each data is processed in a slower speed, i.e., in longer time intervals while reproducing data in a half (½) of the normal speed. To the contrary, if data is reproduced in a speed twice the normal speed (i.e., a double speed), the time intervals of the data bitstream become shortened than the case of section (B). Here, it can be seen from the sections (A) and (B) that the positions of the audio and video frames are identical each other in each data packet in spite of variation of speeds.

In other words, the synchronizer 165 prosecutes the synchronizing operation for the data packets in a sequential order.

The video data synchronized by the synchronizer 165 is transferred to the display unit 150, while the audio data is transferred to the digital-to-analog converter 181 to be converted into an analog signal. The audio data transformed into an analog signal is amplified by the amplifier 182 and then transferred to the speaker 183 to be reproduced into an audio signal in an audible frequency band.

The MPEG processor 160 with such constitutions according to the present invention divides the video and audio data from the MPEG data received from the mobile communication network (or a wireless LAN) by the mobile communication terminal and decodes them under an MPEG standard.

In the normal reproducing speed, the MPEG processor 160 does not prosecute the adjusting operation for a reproducing speed in the speed regulator 164 by the controller 166. Thus, an output data of the video decoder 162 is transferred directly to the display unit 150, and an output data of the audio decoder 163 is transferred directly to the digital-to-analog converter 181.

However, in the changed reproducing speed mode, e.g., in reproducing in a double speed, a video module 164a of the speed regulator 164 is able to adjust a reproducing speed by skipping a partial frame (e.g., B-frame) among video data frames (e.g., I, P, and B frames) in accordance with the operation of the controller 166. During this, the skip operation of frame is preferably carried out by the video decoder 162, which lessens a decoding load of the video decoder 162 to prevent dissipation of resources.

Further, an audio module 164b of the speed regulator 164 adjusts a reproducing speed of the audio data (PCM data) decoded by the audio decoder 163. During this, the audio module 164b controls the PCM data to be without a pitch variation while the reproducing speed being adjusted.

After completing the reproducing speed adjustment by means of the video and audio modules, 164a and 164b, of the speed regulator 164, it occurs distortion of synchronization between the video and audio signals because of data modification therein. Thus, the synchronizer 165 accords the synchronization between the speed-adjusted video and audio data with each other.

The synchronizer 165 prosecutes its synchronizing operation by according a reproducing position of the audio data to the data packet in compliance with the removal of frame (i.e., fast reproducing) or the extension of frame (i.e., slow reproducing) in the video data. Such synchronization is accomplished by according a reproducing position of an audio frame to that of a video frame in the data packet as shown in FIG. 4.

The procedure of adjusting a reproducing speed of contents in the mobile communication terminal embedding the aforementioned MPEG process is as follows.

A user connects with the contents providing server 500 arranged on the internet 400 by way of the mobile communication network (or a wireless LAN) using the mobile communication terminal 100. The contents providing server 500, for rendering contents such as motion pictures or real-time motion pictures (e.g., a TV broadcast) to the mobile communication terminal 100 of the user, receives a contents providing request from the mobile communication terminal 100 after completing user authentication in response to connection of the mobile communication terminal 100.

The contents providing server 500 transmits a corresponding contents with streaming in the format of MPEG data when the contents providing request arrives thereat. The mobile communication terminal 100 stores the MPEG data transferred with streaming into the contents storage unit 170 and also transfers it to the MPEG processor 160.

The MPEG processor 160 divides the video and audio data from the MPEG data by means of the data divider 161, and the divided video data is outputted to the video decoder 162 while the divided audio data is outputted to the audio decoder 163.

The video decoder 162 decodes the divided video data under a predetermined format, while the audio decoder 163 decodes and transforms the divided audio data into the PCM data.

The speed regulator 164 passes the decoded video and audio data. The synchronizer 165 synchronizes the video and audio data with each other and then outputs the synchronized video data to the display unit 150 while outputs the synchronized audio data to the digital-to-analog converter 181.

According to that, the display unit 150 shows an image with the video data, while the digital-to-analog converter 181 transforms the audio data into an analog signal to be outputted to the amplifier 182. Then, the amplifier 182 amplifies the analog signal and outputs the amplified analog signal to the speaker 183 to enable the user to listen to the audio signal.

On the other hand, it may happen for the contents currently being played not to be reproduced continuously when a user desires re-watching the past image or there is an incoming call while watching the contents. The following description is about a method of overcoming the limit arising from those conditions.

First, if there is a call from a mobile phone on watching the contents, the controller 120 of the mobile communication terminal 100 sends a corresponding control signal to the MPEG processor 160. Then, the controller 166 of the MPEG processor 160 terminates reproducing the contents. Even at this time, the data of the contents is continuously received and stored in the contents storage unit 170. During this, the controller 166 monitors the information about a standstill time of reproducing and a running time of the contents at present.

If the user requests a successive reproducing after finishing his call for a predetermined time, the controller 166 enables the contents held in the contents storage unit 170 to be reproduced faster (e.g., a double speed) than the normal speed from the standstill time point, for according the running time of the contents being monitored to the standstill time due to the call receipt.

For the purpose of this operation, the controller 166 enables the data divider 161 to separate the video and audio data from the data stored in the contents storage unit 170 and then to transfer the isolated video and audio data respectively to the video and audio decoders 162 and 163. The decoders 162 and 163 each decode the video and audio data and transfer them to the speed regulator 164.

Then, as aforementioned, the video and audio modules, 164a and 164b, of the speed regulator 164 adjust reproducing speeds of the video and audio data, respectively, and then transfer the speed-adjusted video and audio data to the synchronizer 165. The synchronizer 165 performs the synchronizing operation for the video and audio data.

After completing the synchronization, the synchronizer 165 transfers the video and audio data respectively to the display unit 150 and the digital-to-analog converter 181. As a result, the display unit 150 shows an image with the video data, while the digital-to-analog converter 181 converts the audio data into an analog signal and then outputs the analog signal to the speaker 183 through the amplifier 182.

According as the aforementioned process, the contents data stored in the contents storage unit 170 is reproduced faster than the normal speed, e.g., in a double speed. The controller 166 checks whether a reproducing time of the contents being played in a double speed is identical to that of contents transmitted from the contents providing server 500 in a real time. If the reproducing times are the same each other, the controller 166 stops the double-speed reproducing operation and enables the MPEG processor 160 to reproduce contents data, which is being received at present, in the normal speed.

On the other hand, it is also available for the same method to use in re-watching the past image of broadcasts such as a sports program on slow motions while watching contents. From the time of selecting a slow reproducing mode by a user, contents data being received at present in a real time is continuously stored in the contents storage unit 170, and the MPEG processor 160 returns to a reproducing time designated by the user to prosecute the slow reproducing operation (e.g., in a ½ speed). At this time, the returnable reproducing time may be variable in accordance with the capacity of the contents storage unit 170.

If the user requests the recovery of reproducing position to its original position during the slow reproducing operation mode, the contents is reproduced again in the double speed in order to compensate the delayed reproducing time for the real-time reproducing time. When reaching the real-time reproducing time, i.e., if the reproducing times are identical to each other, the contents are reproduced in the normal reproducing speed.

A transitional sequence in the reproducing speed in accordance with the telephone call aforementioned will be described with reference to a flow chart as follows.

Figure 5:
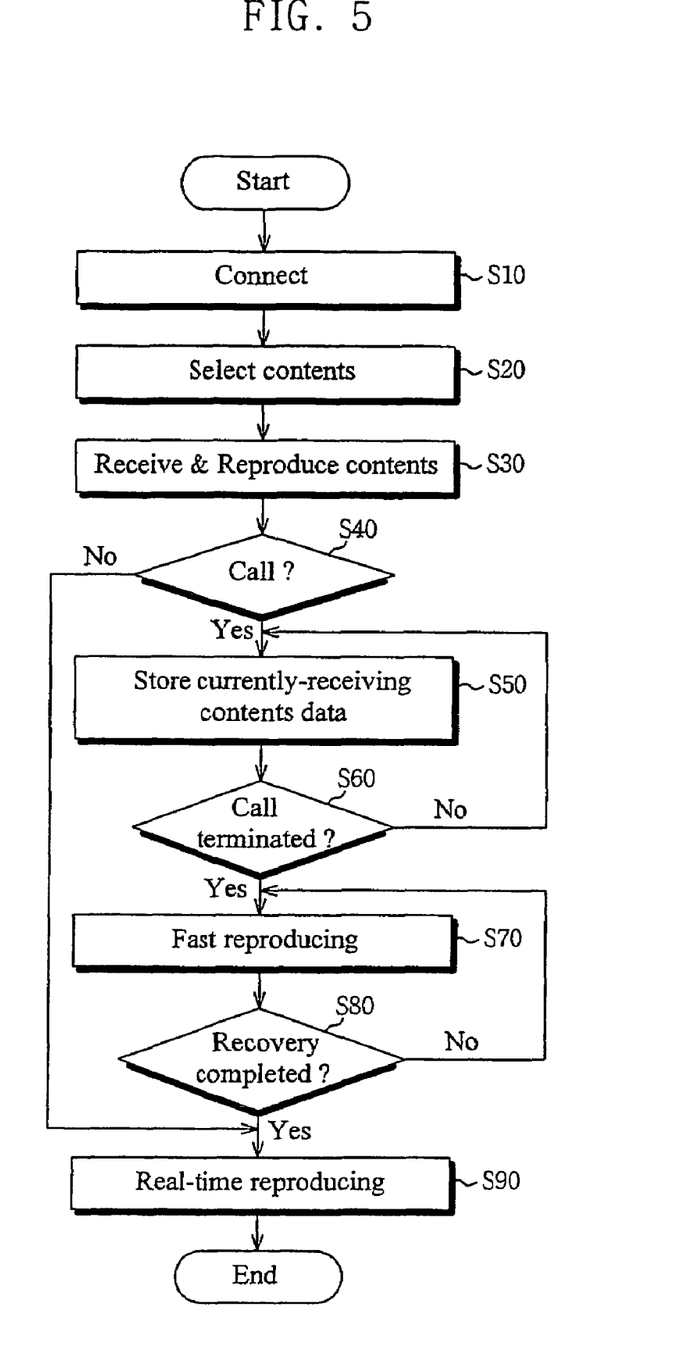
FIG. 5 is a flow chart illustrating a method of providing contents in accordance with the present invention.

FIG. 5 is a flow chart illustrating a method of providing contents in accordance with the present invention.

Referring to FIG. 5, the mobile communication terminal 100 is connected to the internet 400 by way of the mobile communication network, accessing with the contents providing server 500 (S10). After the connection, the user selects desired contents (S20) and the contents providing server 500 transmits the user-selected contents to the mobile communication terminal 100 of the user's.

Then, the mobile communication terminal 100 of the user receives the contents transmitted from the contents providing server 500 and prosecutes a reproducing operation by the aforementioned procedure (S30).

During this, the controller 120 of the mobile communication terminal 100 determines whether there is a receipt of telephone call (S40). If the step S40 determines there is a call receipt, the contents being received at present are stored in the contents storage unit 170 temporarily (S50). Next, it determines whether the telephone call has been terminated (S60). If the telephone call has been terminated, the mobile communication terminal 100 controls the MPEG processor 160 to operate in a faster reproducing mode to recover the real-time reproducing time of contents (S70). At this time, the mobile communication terminal 100 reproduces the contents stored in the contents storage unit 170 in a speed faster than the normal reproducing speed.

Next, it determines whether the faster reproducing time of the step S70 reaches the real-time reproducing time (S80). If the faster reproducing time has reached the real-time reproducing time, the MPEG processor 160 releases the fast reproducing mode and reproduces the contents in the real-time reproducing mode (S90).

Now, it will be described about an operation for adjusting a reproducing speed of MPEG data with a contents providing server, as another embodiment according to the present invention.

Figure 6:
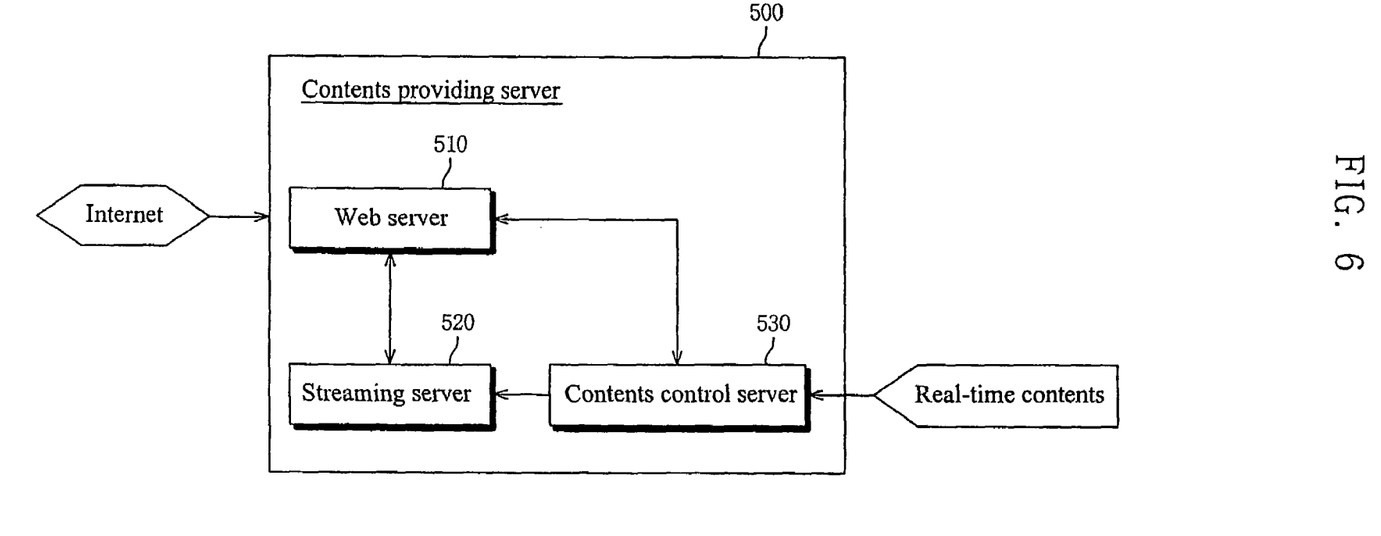
FIG. 6 is a block diagram illustrating an embodied structure of a contents providing server according to the present invention.
Figure 7:
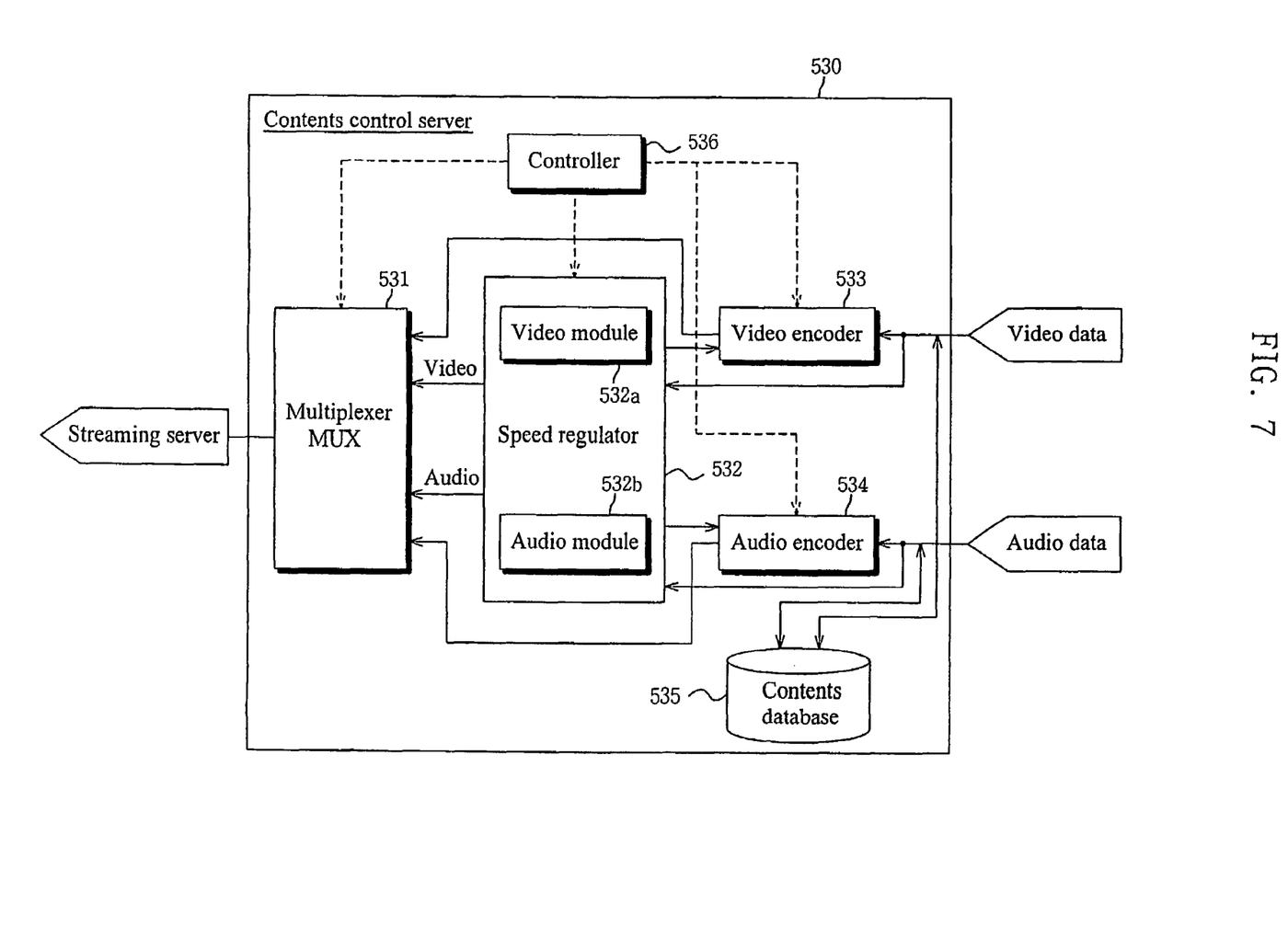
FIG. 7 is a block diagram illustrating an embodied structure of a contents control server according to the present invention.

FIG. 6 is a block diagram illustrating an embodied structure of the contents providing server according to the present invention. FIG. 7 is a block diagram illustrating an embodied structure of the contents control server according to the present invention.

Referring to FIGS. 6 and 7, the contents providing server 500 according to the present invention is comprised of a web server 510 for providing web pages by way of the internet 400 and controlling web connections, a contents control server 530 for managing contents providing conditions and regulating reproducing speeds, and a streaming server 520 for providing MPEG data, which is supplied by the contents control server 530 with motion-picture contents including audio data or audio contents containing audio data only, to a terminal (fixed or mobile) connected thereto through the web server 510 in a streaming service form.

The contents control server 530 includes a controller 536 for managing operations, a video encoder 533 for encoding video data into MPEG data, and an audio encoder 534 for encoding audio data into MPEG data, a speed regulator 532 for adjusting reproducing speeds of video and audio data, and a multiplexer 531 for multiplexing and transferring data encoded by the video and audio encoders 533 and 544 to the streaming server 520. The contents control server 530 also includes a contents database 535 for storing real-time contents or storing/managing predetermined contents.

The contents providing server 500 with the aforementioned structure supplies contents to a user's mobile communication terminal, through the procedure as follows, when there is a request for the contents from the user's mobile communication terminal.

When the mobile communication terminal 100 (or 200) or a fixed terminal 410 is connected to the web server 510 through the internet 400, the web server 510 prosecutes user authentication. After the user authentication, the user requests contents by means of the terminal 100, 200, or 410 and then the web server 510 requests the contents control server 530 to provide the contents in response to the user's request for the contents.

The contents control server 530 identifies the classification of the requested contents, e.g., real-time contents such as TV broadcast or pre-stored contents such as movies in accordance with the request from the web server 510 and then transfers the corresponding contents to the streaming server 520 in compliance with the identification result. Thus, the streaming server 520 provides a streaming service with the corresponding contents to the user's terminal.

The contents control server 530 receives video and audio data of real-time contents from an external device when the contents requested by the user are the real-time contents. When the contents requested by the user are pre-stored contents, the contents control server 530 loads the pre-stored contents corresponding thereto from the contents database 535.

First, it will be described about the procedure of providing with the real-time contents.

In the case with the real-time contents, the video data is applied to the video encoder 533 to be encoded to MPEG data therein, while the audio data (PCM data) is applied to the audio encoder 534 to be encoded therein. The data encoded by the video and audio encoders 533 and 534 are multiplexed by the multiplexer 531 and then transferred to the streaming server 520.

During this, if a reproducing-speed adjusting command is transferred from the user, the web server 510 transfers the command to the controller 536 of the contents control server 530 and the controller 536 prosecutes a control operation for each component in compliance with the command as follows.

For instance, if the reproducing-speed adjusting command is to slow down a reproducing speed, i.e., a half-speed reproducing command for watching slow motions as desired in sports relay-broadcasting, the real-time video and audio data are buffed through the contents database 535 and then inputted to the speed regulator 532.

The speed regulator 532 outputs the video data to the video encoder 533 with a half (½) reproducing speed adjusted by the video module 532*a*, while outputs the audio data (PCM data) to the audio encoder 534 with a half (½) reproducing speed adjusted by the audio module 532*b*. During this, the audio module 532*b* adjusts the reproducing speed of the audio data to the half speed without variation of pitches.

Then, the video and audio encoders, 533 and 534, encode the reproducing-speed adjusted data supplied from the speed regulator 532 and transfer them to the multiplexer 531. While this, the real-time contents data is continuously stored in the contents database 535 in concordance with the normal reproducing time and the controller 536 monitors the real-time reproducing time successively.

The contents adjusted in the half reproducing speed are transferred to the user's terminal through the streaming server 520. Thus, the user is able to enjoy the contents in the half reproducing speed by processing the contents with a general MPEG reproducing method.

On the other hand, if a normal-speed reproducing command is introduced from the user's terminal while reproducing the contents in the half speed, the controller 536 sets a reproducing time faster, e.g., a double speed, in order to recover a time delay from the reproducing standstill time to a current reproducing time.

According as that, the video and audio modules, 532*a* and 532*b*, of the speed regulator 532 adjust a reproducing speed of the real-time contents, continuously being stored in the contents database 535, in a double speed, and output the adjusted data to the video and audio encoders 533 and 534. The encoders 533 and 534 encode their corresponding data and transfer them to the multiplexer 531. The multiplexer 531 multiplexes and transfers the data to the streaming server 520. The successive process is as same as the described above.

As same as the aforementioned procedure, it is also possible to provide a service for pre-stored contents.

It will be described as follows about the service procedure aforementioned with reference to a flow chart in FIG. 8.

Figure 8:
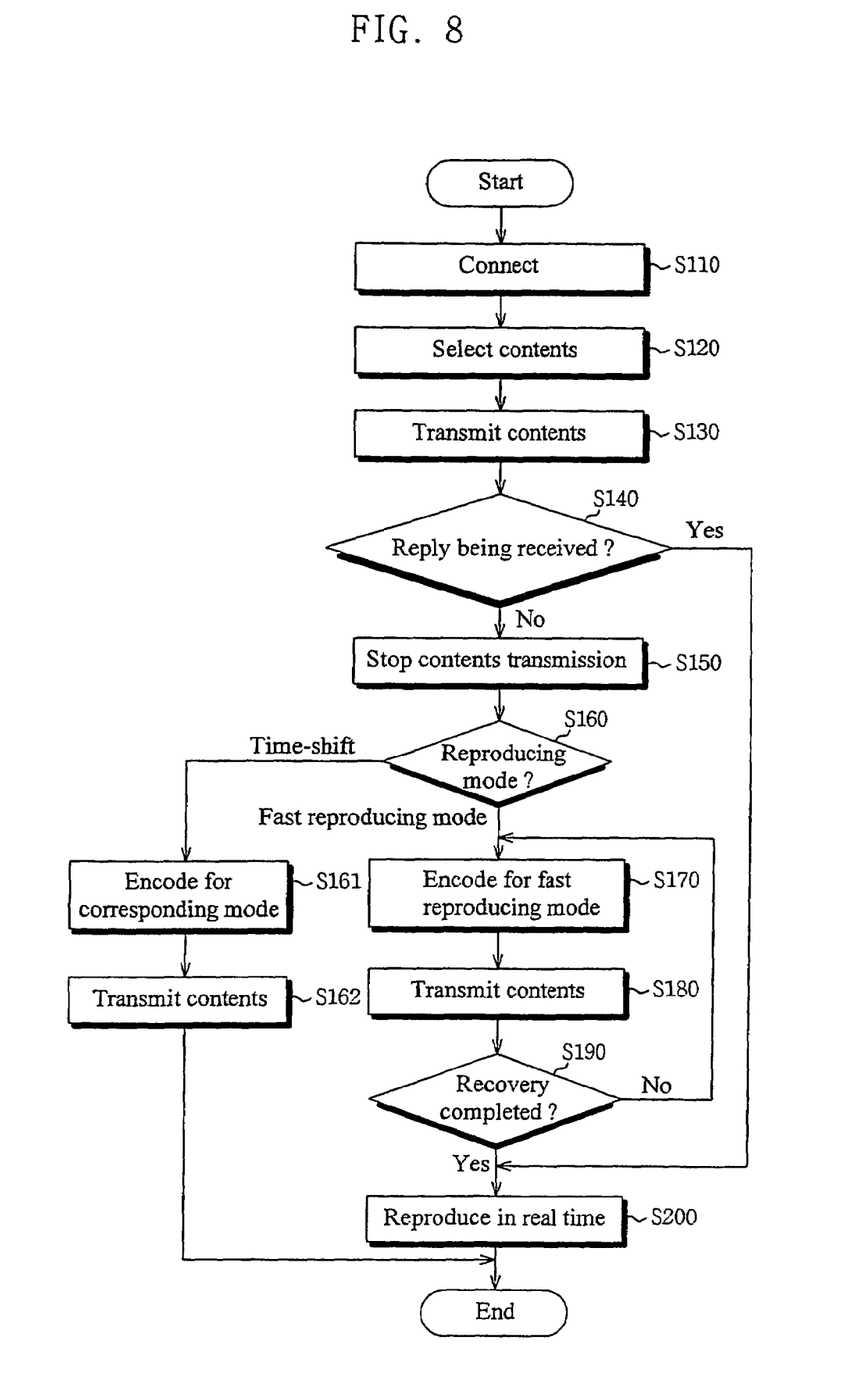
FIG. 8 is a flow chart illustrating another embodiment of a method for providing contents in accordance with the present invention.

FIG. 8 is a flow chart illustrating an embodiment of a method for providing contents in accordance with the present invention.

Referring to FIG. 8, when a user is connected to the web server 510 of the contents providing server 500 by means of the mobile communication terminal (S110) and selects contents therein (S120), the web server 510 sends a requesting message to the contents control server 530 so as to transmit the corresponding contents to the mobile communication terminal of the user.

Then, the contents control server 530 transmits the corresponding contents to the user's mobile communication terminal by way of the streaming server 520 in response to the request (S130), the process of which is the same with the aforementioned.

The contents control server 530 determines whether a reply transmitted from the mobile communication terminal has been received in a normal state (S140). If the step S140 determines that the reply from the user's mobile communication terminal has not been received in a normal state, the contents control server 530 stops the transmission of the contents (S150). The standstill of transmission may be caused by communication troubles or line busy at the mobile communication terminal.

Next, the contents control server 530 confirms a reproducing mode requested from the user's mobile communication terminal (S160).

If the step S160 confirms the requested reproducing mode is a time-shift mode, the contents control server 530 prosecutes an encoding operation (S161) and transfers the encoded result (S162) in response to the requested time-shift mode.

Otherwise, if the step S160 confirms the requested reproducing mode is a fast reproducing mode, the contents control server 530 prosecutes an encoding operation in the fast reproducing mode as the aforementioned (S170) and transmits the encoded result to the user's mobile communication terminal by way of the streaming server 520 (S180).

And, the contents control server 530 confirms whether the fast reproducing time reaches the real-time reproducing time (S190). If the fast reproducing time reaches the real-time reproducing time, the contents control server 530 releases the fast reproducing mode and resumes the real-time reproducing mode (S200).

As stated above, the contents providing system according to the present invention is effective in offering real-time or pre-stored digital contents to a terminal of a user, and recovering a real-time reproducing time by adjusting a reproducing time even when contents transmission is interrupted by line busy or communication trouble or a user's intention for re-watching the past image while providing contents.

INDUSTRIAL APPLICABILITY

The present invention is applicable to a contents providing system capable of providing various patterns in reproducing contents preliminarily stored or in a real time by means of a mobile communication terminal, and to a mobile communication terminal adaptable to reproducing the contents.

What is claimed is:

1. A contents providing system including a contents providing server for providing digital contents to a mobile communication terminal through a mobile communication network, the contents providing server comprising:
    a web server for providing a web page by way of an internet and controlling web connection;
    a contents control server for managing a contents providing condition and regulating a reproducing speed; and
    a streaming server for providing MPEG data, which is supplied by the contents control server with motion-picture contents including audio data or audio contents containing audio data only, to a mobile communication terminal connected thereto through the web server in a streaming service form, wherein the contents control server further comprises:
    a controller for managing operations;
    a video encoder for encoding video data into MPEG data;
    an audio encoder for encoding audio data into MPEG data;
    a speed regulator for adjusting reproducing speeds of video and audio data; and
    a multiplexer for multiplexing and transferring data encoded from the video and audio encoders to the streaming server.

2. The contents providing system according to claim 1, wherein the contents control server comprises a contents database for storing real-time contents or storing/managing predetermined contents.

3. The contents providing system according to claim 2, wherein the contents control server stops current contents transmission if there is absence of a reply receipt while monitoring the reply receipt from a mobile phone, and resumes encoding contents at a beginning time of the reply to transfer the contents to the streaming server for providing the contents to the mobile communication terminal.

4. The contents providing system according to claim 3, wherein the contents control server monitors a standstill time of the contents transmission, and controls the speed regulator, the audio encoder, and the video encoder to encode the interrupted contents in a reproducing speed faster than a normal speed and to transfer the encoded contents to the streaming server.

5. The contents providing system according to claim 4, wherein the contents control server controls a reproducing speed in compliance with a command included in a reply from the mobile communication terminal, and controls the speed regulator, the audio encoder, and the video encoder to encode the interrupted contents in a normal speed when the fast reproducing time reaches a real-time reproducing time.

* * * * *

UNITED STATES PATENT AND TRADEMARK OFFICE
CERTIFICATE OF CORRECTION

PATENT NO.        : 7,574,169 B2
APPLICATION NO. : 10/569520
DATED             : August 11, 2009
INVENTOR(S)       : Jean Koh It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 385 days.

Signed and Sealed this

Seventh Day of September, 2010

David J. Kappos
*Director of the United States Patent and Trademark Office*